Patented Mar. 11, 1941

2,234,183

UNITED STATES PATENT OFFICE 2,234,183

INK COMPOSITION OF MATTER

Frederick V. Lofgren, Valparaiso, Ind., assignor to Glenn Davidson, Aurora, Ill.

No Drawing. Application March 15, 1937, Serial No. 131,009

9 Claims. (Cl. 134—35)

In the preparation of "colors" such as for printing wall paper, it has been customary for some time to make up compositions of suitable body employing starch or animal glue or casein. These have various limitations in applicability and results. In accordance with the present invention however, it now becomes possible to put together into composition certain ingredients which have heretofore been regarded as incompatible for coating liquids, and the resultant compositions provide products which are outstanding in smoothness of flowage, and in evenness and durability of finish, on exposure to drastic conditions.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

For making up the present composition, oil seed flour is disseminated in water, with thorough stirring. Desirably a seed flour such as soya bean flour, or as peanut, cotton seed, hemp seed, castor bean, lupine and the like. The oil seed flours of this character are in general made by grinding the residue left after removal of oil in commercial practice, and desirably a flour such as from soya bean which has not been heated much in connection with the oil extraction process, or which has not been changed at all by heat, is employed. An advantageous flour is one which when made up in suitable dispersion will show viscosity of 125 or less, and preferably less than 100, on a MacMichael viscometer using a #30 wire, 20 R. P. M. and a ⅜ inch bob immersed to a depth of ¾ inch. That is, for such test the dispersion is made up by mixing soya bean flour with water at the rate of one hundred pounds to three hundred pounds of water at 85° F., with stirring out of lumps, then adding one gallon of 26° Bé. ammonia and stirring fifteen minutes, and then adding one gallon of pine oil and stirring five minutes. As indicated, a test sample so made up and showing a viscosity of 125 or less illustrates an oil seed flour of desirable character.

With the oil seed flour made up with sufficient water and stirred to a smooth suspension, soap, as for instance as dissolved in water, is added, and the mixture is stirred thoroughly. The soap is preferably the fatty acid soap of an alkali such as sodium, potassium, or ammonium, the well-known soap-making fats and oils being involved. Less desirably, naphthenic and rosin soaps may be employed. Having incorporated the soap with the oil seed flour, preferably pine oil is thoroughly stirred in. The mixture is next brought together with the pigment to be employed. Generally, this is more particularly kaolin or clays such as the usual paper coating clays; also other pigments, the particular pigments depending upon the particular color of ink or coating desired. Among other white pigments may be for instance talc, lithopone, zinc oxide, etc., and colored pigments may include for instance sienna, umber, carbon black, lakes, etc. The pigment, or clay or the like, is desirably first suspended in water, and this is incorporated with the oil seed flour mixture. Finally, water glass is added. The water glass may be sodium silicate or other soluble silicate, and for instance sodium silicate of 3.25 SiO$_2$/1Na$_2$O ratio, although it is not critical, and it may be supplied by diluting stock of 40° Baumé, or less. Further tinting colors may be incorporated if desired. The amount of water glass may vary, depending upon the particular products in view, and may be three per cent or more based on the flour, to one hundred per cent or more, as up to one hundred fifty, as desired. While water glass is particularly advantageous, in some instances, instead of the water glass, in whole or part, other water soluble basic agents may be used, but in every case after the clay or the like has been incorporated with the oil seed flour, and among such basic agents may be for instance trisodium phosphate, sodium carbonate, caustic soda, ammonia, borax, tetra alkyl ammonium hydroxide, ethylenediamine, triethanolamine, etc., in amounts molecularly equivalent to the sodium silicate. And, for convenience, the sodium silicate and such agents may be designated "water soluble basic agents." The amount of soap employed may be over five per cent, and up to twenty per cent or more, and preferably around ten per cent. If pine oil is employed, it may be in amount of about five to twelve or seven to twelve per cent, as based on the dry flour. Such amounts of soap are remarkably large in connection with the material such as oil seed flour. And, for the present purposes, lessening the amount of water glass per equivalent below the amounts indicated above as preferred, necessitates in general the raising of the amount of the oil seed flour in compensation; while a lessening of the amount of soap below the amounts indicated as preferred, tends to lessen the water resistance of the product as finally in finished position. The preferred stated amounts yield products having a water resistance heretofore unknown to this type of material. In some instances, instead of adding the soap as such, the oil seed flour may be dispersed with a caustic soda solution and soap-making fatty acid may be added to the mixture.

As an example of the full procedure: For each hundred pounds of dry soya bean flour, for instance three hundred pounds of water is employed, the flour being stirred therein to a smooth suspension, then ten pounds of a sodium tallow soap dissolved in one hundred pounds of water is added and the mixture stirred. Preferably, pine oil is then added in amount of one gallon. The mixture is now incorporated with the clay or other pigments, at the rate of one hundred pounds of dry clay or the like to each thirty pounds of the aforesaid mixture (corresponding to about six pounds of dry soya bean flour). Desirably the clay or like pigment is incorporated as an aqueous suspension, with one hundred pounds of the clay and sixty-five pounds of water, to each thirty pounds of the oil seed mixture as stated. After all is thoroughly mixed, six pounds of 40° Bé. water glass diluted with eighteen pounds of water are added and thoroughly mixed, and further tinting colors may be added. If it were attempted to add the water glass at a stage prior to the clay or pigment, the mixture would jell. I have made the surprising discovery however that if the water glass be introduced after the oil seed flour has had an opportunity for such action as occurs with the clay or the like, the mixture instead of thickening and setting, becomes more fluid, and the water glass furthermore, in such connection is found to have greatly reduced the amount of oil seed flour necessary. I have found also, that proceeding in this manner, amounts of soap can be introduced that have heretofore been impossible in connection with such material as oil seed flour. In the present invention, there is the surprising result that two agents, viz. water glass and soap, which have been heretofore regarded as impossible with oil seed flours for liquid coating compositions, such as to be applicable with printing machinery, can now be brought together, with strikingly advantageous workability and final properties. And in fact, novel non-jelling liquid coating compositions of oil seed flour and water glass, the oil seed flour and amounts of soap prima facie apparently impossible, are had. The composition is applied for instance by machinery of the roller-applying type, and paper or other sheet material, textile fabric, may be treated. Where for instance wall paper is to be made from such composition, the paper is first coated with the ground, which may be colorless or of any color as desired, and then the final designs are printed on, the color thereof being determined in each instance in accordance with the particular color of pigments employed in the composition. If it is desired to make a non-washable wall paper, the soap as above-noted may be substituted by ammonia or other alkali and the procedure followed. If wall paper printed from such ink were then to be treated with hardening agents, it would not form an extremely satisfactory washable wall paper. On the other hand, by including the soap, and subjecting the paper after printing to the action of hardening agents such as formaldehyde, or more desirably an aluminum salt, a very remarkable waterproofness product results. Thus, with preferred soap ingredient of the fatty acids of higher molecular weight, as for instance those of tallow, cotton seed, etc., and subjection of the coated article to a hardening treatment by a solution of two and a half pounds of aluminum sulphate and one pound of sodium acetate to each hundred pounds of water, and the finally dried fabric has a water resistance almost approaching that of oilcloth. The present composition, at the same time, makes possible the coating of paper or other fabric, with relatively low cost and particular smoothness of operation and finish. Wall papers printed from such compositions as ink, have excellent brightness of color and finish.

Other modes of applying the principle of the invention may be employed, change being made as regards the details described, provided the features stated in any of the following claims, or in the equivalent of such, be employed.

I therefore particularly point out and distinctly claim as my invention:

1. A liquid coating composition suitable for ink applicable by roller machinery, which comprises oil seed flour in water, soap five to twenty per cent based on the dry flour, pine oil five to twelve per cent, pigment, and water glass.

2. A liquid coating composition suitable for ink applicable by roller machinery, which comprises soya bean flour in water, soap five to about twenty per cent based on the dry flour, pine oil five to twelve per cent, pigment, and water glass three to one hundred fifty per cent based on the soya bean flour.

3. A liquid coating composition suitable for ink applicable by roller machinery, which comprises oil seed flour in water, soap five to about twenty per cent based on the flour, pigment, and a water soluble basic agent.

4. A non-jelling liquid coating composition suitable for ink applicable by roller machinery, which comprises soya bean flour in water, soap five to about twenty per cent based on the flour, pigment, and a water-soluble basic agent in dispersing amount.

5. A process of making a non-jelling liquid composition such as to be applicable by machinery on the order of printing machinery, which comprises mixing oil seed flour with water, then incorporating therewith five to about twenty per cent of soap based on the dry flour, pine oil five to twelve per cent, and pigments, and finally adding water glass.

6. A process of making a non-jelling liquid composition such as to be applicable by machinery on the order of printing machinery, which comprises mixing soya bean flour in water, then incorporating therewith five to twenty per cent of soap based on the dry flour, pine oil five to twelve per cent, and pigments, and finally adding water glass three to about one hundred fifty per cent based on the soya bean flour.

7. A process of making a non-jelling liquid coating material, which comprises mixing oil seed flour in water, then incorporating five to about twenty per cent of soap based on the dry flour, then incorporating pigment, and finally water glass.

8. A process of making a non-jelling liquid coating material, which comprises mixing soya bean flour with five to about twenty per cent of soap based on the dry flour, then incorporating pigment, and water glass, in order, the whole being dispersed in water.

9. A process of making a liquid composition free from jelling such as to be applicable by machinery on the order of printing machinery, which comprises mixing oil seed flour with water, 5 to 20% of soap based on the dry flour and pigment, in order, and a water soluble basic agent.

FREDERICK V. LOFGREN.